US010421362B2

(12) United States Patent
Hall et al.

(10) Patent No.: US 10,421,362 B2
(45) Date of Patent: Sep. 24, 2019

(54) REGENERATIVE BRAKING CONTROL METHOD AND SYSTEM

(71) Applicant: Faraday&Future Inc., Gardena, CA (US)

(72) Inventors: Thomas Jackson Hall, White Lake, MI (US); Brian Neal Harries, Hermosa Beach, CA (US); Som Khamly, Clarkston, MI (US)

(73) Assignee: FARADAY&FUTURE INC., Gardena, CA (US)

( * ) Notice: Subject to any disclaimer, the term of this patent is extended or adjusted under 35 U.S.C. 154(b) by 136 days.

(21) Appl. No.: 15/283,205

(22) Filed: Sep. 30, 2016

(65) Prior Publication Data
US 2018/0093572 A1    Apr. 5, 2018

(51) Int. Cl.
| | | |
|---|---|---|
| *B60L 7/26* | (2006.01) | |
| *B60T 1/10* | (2006.01) | |
| *B60T 8/24* | (2006.01) | |
| *B60T 8/171* | (2006.01) | |

(52) U.S. Cl.
CPC ............... *B60L 7/26* (2013.01); *B60T 1/10* (2013.01); *B60T 8/171* (2013.01); *B60T 8/241* (2013.01); *B60T 8/245* (2013.01); *B60T 8/246* (2013.01); *B60L 2250/28* (2013.01); *B60T 2270/604* (2013.01)

(58) Field of Classification Search
CPC ........ B60L 7/26; B60L 2250/26; B60T 8/246; B60T 8/245; B60T 8/171; B60T 8/241; B60T 2270/604
See application file for complete search history.

(56) References Cited

U.S. PATENT DOCUMENTS

| | | | | |
|---|---|---|---|---|
| 4,270,806 | A * | 6/1981 | Venkataperumal | ... B60T 13/586 303/3 |
| 9,321,355 | B1 * | 4/2016 | Shah | ......................... B60L 7/18 |
| 9,963,141 | B2 * | 5/2018 | Yamamoto | ............... B60K 6/48 |
| 2005/0189894 | A1 * | 9/2005 | Komiyama | ............. B60K 6/46 318/376 |
| 2009/0260901 | A1 * | 10/2009 | Ishii | ....................... A01D 34/78 180/6.5 |
| 2012/0022735 | A1 * | 1/2012 | Tashiro | ..................... B60L 7/18 701/22 |
| 2013/0289809 | A1 * | 10/2013 | Treharne | ................. B60L 1/003 701/22 |
| 2013/0317681 | A1 * | 11/2013 | Bissontz | .................. B60T 1/10 701/22 |
| 2014/0081498 | A1 * | 3/2014 | Weng | ....................... B60L 7/18 701/22 |

(Continued)

*Primary Examiner* — Frederick M Brushaber
(74) *Attorney, Agent, or Firm* — Veros Legal Solutions, LLP

(57) ABSTRACT

A regenerative braking system separate from a friction braking system of a vehicle is disclosed. According to certain embodiments, the regenerative braking system may include at least one actuator and a controller. The controller may be configured to: determine whether an accelerator pedal is depressed; when the accelerator pedal is depressed, determine an amount of regenerative braking based on behavior of the accelerator pedal; when the accelerator pedal is not depressed, determine the amount of regenerative braking based on motion of the vehicle; and control the at least one actuator to generate the determined amount of regenerative braking.

20 Claims, 6 Drawing Sheets

(56) References Cited

U.S. PATENT DOCUMENTS

| | | | |
|---|---|---|---|
| 2015/0019058 A1* | 1/2015 | Georgiev | B60L 7/18 |
| | | | 701/22 |
| 2015/0066326 A1* | 3/2015 | Furuyama | B60T 7/042 |
| | | | 701/70 |
| 2015/0222209 A1* | 8/2015 | Crisp | H02P 3/14 |
| | | | 318/376 |
| 2017/0066437 A1* | 3/2017 | Yamamoto | B60K 6/48 |

* cited by examiner

REGENERATIVE BRAKING CONTROL METHOD AND SYSTEM

TECHNICAL FIELD

The present disclosure relates generally to a regenerative braking control method for a vehicle, and more particularly, to a method for controlling a regenerative braking system that is not part of the service brake system of the vehicle, to provide calibratable and scalable regenerative braking torques during the entire range of braking events experienced by the vehicle.

BACKGROUND

Regenerative braking, coupled with the recent technology advance in hybrid electric vehicles (HEVs) and electric vehicles (EVs), provides a promising route to reduce fuel consumption and emission. With regenerative braking, the kinetic energy of a vehicle can be converted back into electric energy, which is stored in an energy storage system, typically a battery, for future use.

As implemented in HEVs and EVs, regenerative braking in many parts of the world is regulated by the following regulations: European Directive 71/320/EEC; UNECE (United Nations Economic Commission for Europe) Regulation 13H for Cars (M1) and optionally Light Commercials (N1); and UNECE Regulation 13.11 for virtually all other vehicles. The corresponding document for U S manufactured vehicles is known as "Federal Motor Vehicle Safety Standard 135—Light Vehicle Brake Systems (U.S. Department of Transportation, 2005)." A vehicle manufacturer is required to comply with one or more of these regulations.

The above regulations, e.g., Regulations 13H and 13.11, define two categories, namely, Category A and Category B, of regenerative braking systems (RBS). Specifically, "Category A" RBS is not part of a vehicle's service brake system (i.e., friction brakes) and is only controlled by a driver through the accelerator/throttle and/or the gear neutral position. In contrast, "Category B" RBS is part of the service brake system. Category B RBS may be activated at the same time or slightly after the service brake system is activated (i.e., "parallel" or "non-phased" braking strategy), or be controlled to deliver regenerative braking torque ahead of the development of the friction braking torque (i.e., "serial" or "phased" braking strategy).

Category A RBS operates independently from the service brake system. That is, the input of Category A RBS does not depend on input on the brake pedal and the output (i.e., regenerative braking torque) of Category A RBS does not need to be blended with the friction braking torque. Thus, compared to Category B RBS, Category A RBS requires simpler hardware design and software control scheme, and costs less. Moreover, because Category A RBS does not need to be integrated into the service brake system, which is usually a separate module sold by brake suppliers, Category A RBS can be developed and/or customized by the vehicle manufacturers and customers.

Despite the above advantages, the maximum energy recoverable by a conventional Category A RBS is limited by the movable range of the accelerator/throttle. After the accelerator/throttle is fully released, the RBS is unable to produce any additional braking torque. The disclosed regenerative braking control method and system are directed to mitigating or overcoming one or more of the problems set forth above and/or other problems in the prior art.

SUMMARY

One aspect of the present disclosure is directed to a regenerative braking system for a vehicle. The regenerative braking system is separate from a friction braking system of the vehicle. The regenerative braking system may include at least one actuator and a controller. The controller may be configured to: determine whether an accelerator pedal is depressed; when the accelerator pedal is depressed, determine an amount of regenerative braking based on behavior of the accelerator pedal; when the accelerator pedal is not depressed, determine the amount of regenerative braking based on motion of the vehicle; and control the at least one actuator to generate the determined amount of regenerative braking.

Another aspect of the present disclosure is directed to a computer-implemented method for controlling a regenerative braking system separate from a friction braking system of a vehicle. The method may include determining whether an accelerator pedal is depressed. The method may also include when the accelerator pedal is depressed, determining an amount of regenerative braking based on behavior of the accelerator pedal. The method may also include when the accelerator pedal is not depressed, determining the amount of regenerative braking based on motion of the vehicle. The method may further include controlling at least one actuator to generate the determined amount of regenerative braking.

Yet another aspect of the present disclosure is directed to a vehicle. The vehicle may include a friction braking system and a regenerative braking system separate from the friction braking system. The regenerative braking system may include an accelerator pedal, at least one actuator, and a controller. The controller may be configured to: determine whether an accelerator pedal is depressed; when the accelerator pedal is depressed, determine an amount of regenerative braking based on behavior of the accelerator pedal; when the accelerator pedal is not depressed, determine the amount of regenerative braking based on motion of the vehicle; and control the at least one actuator to generate the determined amount of regenerative braking.

DETAILED DESCRIPTION

Figure 1:
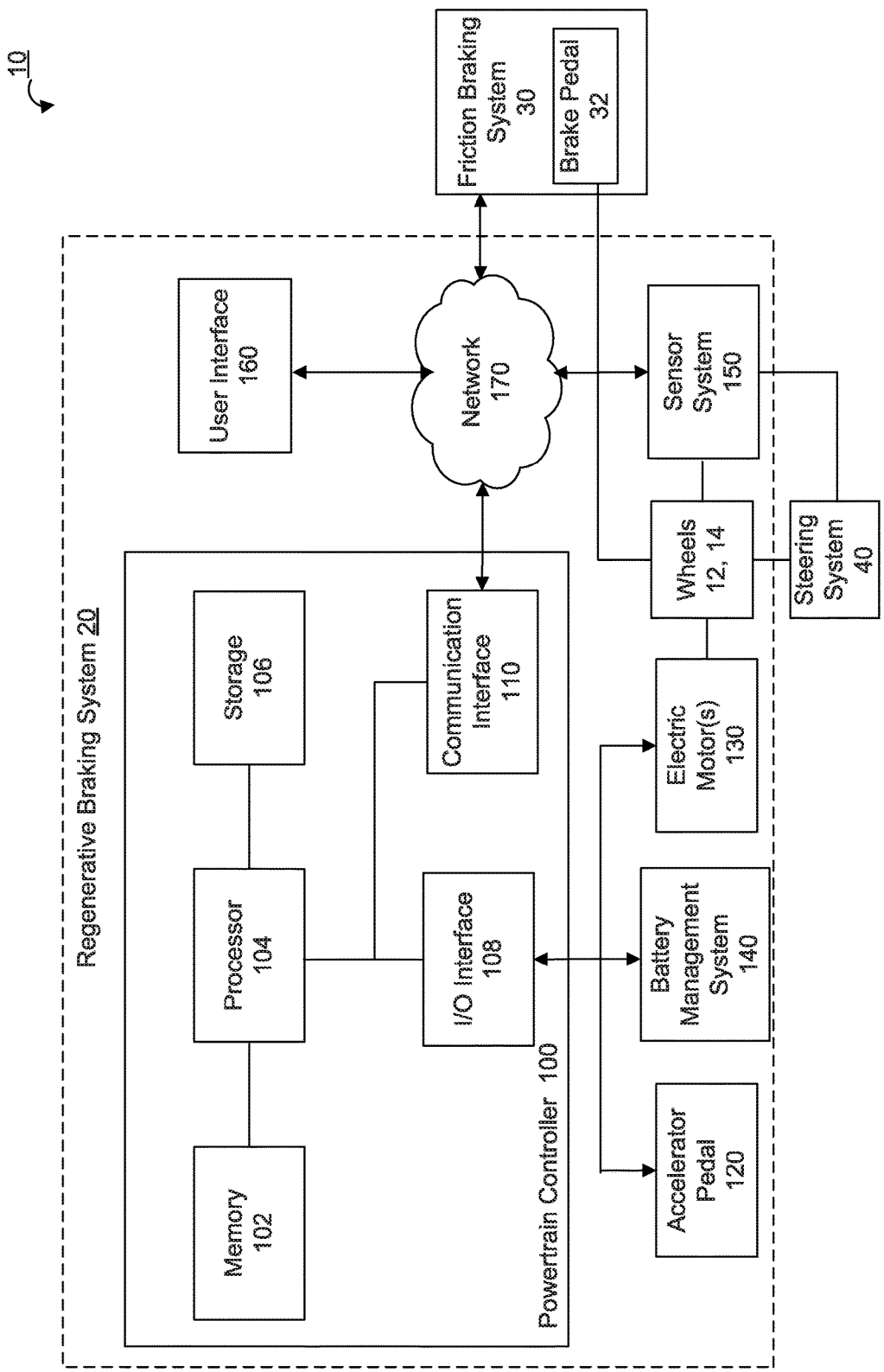
FIG. 1 is a block diagram of a vehicle with a Category A regenerative braking system, according to an exemplary embodiment.

This disclosure is generally directed to a regenerative braking control method and system for decelerating a vehicle. For example, FIG. 1 is a block diagram of an exemplary vehicle 10 in which the disclosed method and system may be implemented. It is contemplated that vehicle 10 may be an electric vehicle, a fuel cell vehicle, a hybrid vehicle, or a conventional internal combustion engine vehicle. Vehicle 10 may have any body style, such as a sports car, a coupe, a sedan, a pick-up truck, a station wagon, a sports utility vehicle (SUV), a minivan, or a conversion van. Referring to FIG. 1, vehicle 10 may include at least a pair of front wheels 12 and a pair of rear wheels 14. Vehicle 10 may be configured to be all wheel drive (AWD), front wheel drive (FWR), or rear wheel drive (RWD). Vehicle 10 may be configured to be operated by an operator occupying vehicle 10, remotely controlled, and/or autonomous.

Still referring to FIG. 1, vehicle 10 may include both a regenerative braking system (RBS) 20 and a friction braking system 30 for providing the necessary braking torques (namely, regenerative braking torques and friction braking torques) to decelerate vehicle 10. Friction braking system 30 may include a brake pedal 32 for receiving user input. When an operator of vehicle 10 depress brake pedal 32, friction braking system 30 may apply pressure to brake calipers mounted on each wheel 12, 14, so as to slow down wheels 12, 14. Generally, the amount of friction braking torque depends on the operator's manner of depressing brake pedal 32, such as how hard (i.e., force) and/or how fast (i.e., speed) the operator depresses brake pedal 32.

Consistent with the disclosed embodiments, RBS 20 may be configured as a Category A RBS. As such, RBS 20 is not part of and operates independently from friction braking system 30. That is, RBS 20 cannot be controlled by brake pedal 32 or cannot use the input of friction braking system 30. Moreover, the output of RBS 20 (i.e., regenerative braking torques) and friction braking system 30 (i.e., friction braking torques) cannot be feasibly coordinated using existing brake-blending strategies.

With continued reference to FIG. 1, RBS 20 may include a powertrain controller 100, an accelerator pedal 120, one or more electric motors 130, a battery management system (BMS) 140, a sensor system 150, a user interface 160, a network 170, and wheels 12, 14.

As a Category A system, RBS 20 utilizes inputs independent from friction braking system 30 to determine the amount of regenerative braking to be generated. For example, accelerator pedal 120 may be used to provide input for RBS 20. When an initially depressed accelerator pedal 120 is partially or fully released, RBS 20 may be activated to generate an amount of regenerative braking based on the behavior of accelerator pedal 120, which indicates the manner of the operator in releasing accelerator pedal 120. As such, the operator may depress or release accelerator pedal 120 to accelerate or decelerate vehicle 10. In trips during which the required braking is modest, the operator may perform so called "one pedal driving" by using only accelerator pedal 120, without relying on brake pedal 32 at all.

Specifically, accelerator pedal 120 may be configured to generate a signal indicative of the position (hereinafter also referred to as "$X_A$") or the amount of depression (hereinafter also referred to as "$D_A$") of the pedal. In some embodiments, a threshold of the depression, $D_{coast}$, may be set for accelerator pedal 120. $D_{coast}$ corresponds to a coasting position ($X_{coast}$) of accelerator pedal 120, at which vehicle 10 generates neither a traction torque nor a regenerative braking torque. In various embodiments, $X_{coast}$ may be a fixed position or a function of the speed of vehicle 10. If $D_A > D_{coast}$, vehicle 10 is accelerated by traction torques produced by engines and/or motors. If $D_A = D_{coast}$, vehicle 10 coasts. Moreover, if $0 \leq D_A < D_{coast}$, vehicle 10 is decelerated by the regenerative braking torques generated by RBS 20.

In exemplary embodiments, RBS 20 may be configured to receive the signal generated by accelerator pedal 120 and translate it into the operator's desired deceleration. For example, RBS 20 may be configured to maintain a predetermined corresponding relationship between $D_A$ and a target deceleration of vehicle 10. This way, RBS 20 may create a consistent driving experience for the operator. In one embodiment, the target deceleration is set to be inversely proportional to $D_A$, which makes it easy for the operator to build muscle memory about the pedal depression and the corresponding target deceleration. It is contemplated that the relationship between $D_A$ and the deceleration of vehicle 10 may be linear or non-linear.

As another example, RBS 20 may be configured to decelerate vehicle 10 based on the speed at which accelerator pedal 120 is released. Typically, the faster the operator releases accelerator pedal 120, the faster the operator intends to decelerate vehicle 10. Accordingly, RBS 20 may generate an amount of regenerative braking proportional to the releasing speed of accelerator pedal 120.

When accelerator pedal 120 is fully released (i.e., placed at "off" position), the maximum amount of regenerative braking and thus vehicle deceleration capable of being commanded by accelerator pedal 120 are achieved. The maximum amount of commanded regenerative braking may be configured to vary depending on the speed of vehicle 10. For example, to recover more energy in city driving conditions, the maximum amount of commanded regenerative braking may be higher at lower speeds of vehicle 20.

Despite such adjustability, the maximum amount of regenerative braking achievable and the maximum amount of energy recoverable by controlling accelerator pedal 120 is limited by several factors. In particular, once the operator removes her foot from accelerator pedal 120, no additional regenerative braking can be commanded by accelerator pedal 120. Furthermore, the maximum amount of regenerative braking and deceleration commanded by brake pedal 120 are also limited by the tolerance of average drivers. For example, the maximum amount of regenerative braking suitable to be commanded by accelerator pedal 120 may be limited to 0.13 g-0.15 g. Amounts of regenerative braking higher than this limit may exceed the average drivers' expectation and could reduce user experience. As such, when the operator needs to command additional braking, such as during an emergency stop, she has to depress brake pedal 32 to activate friction braking system 30. The friction braking, however, is achieved by converting the kinetic energy of vehicle 10 into heat and cannot recover energy for future use.

Consistent with the present disclosure, to improve energy efficiency of vehicle 10, the disclosed method may be performed to extend the usage of RBS 20 into braking events, during which friction braking system 30 is typically used. In particular, RBS 20 may be operated based on variables independent from the input of friction braking system 30, and configured to generate an amount of regenerative braking that can be calibrated and scaled based on the operator's preference and/or driving habit. This way, RBS 20 can make contributions to the entire range of braking events experienced by vehicle 10, while remaining independent from friction braking system 30 both structurally and operationally.

The disclosed braking method may be performed by powertrain controller 100. With continued reference to FIG. 1, powertrain controller 100 may include, among other things, a memory 102, a processor 104, a storage 106, an input/output (I/O) interface 108, and a communication interface 110. In some embodiments, powertrain controller 100 may be implanted as part or whole of an electronic control module (ECM). At least some of these components of powertrain controller 100 may be configured to transfer data and send or receive instructions between or among each other. Exemplary structures and functions of the components are outlined below.

Processor 104 may include any appropriate type of general-purpose or special-purpose microprocessor, digital signal processor, or microcontroller. Processor 104 may be configured as a separate processor module dedicated to control and actuate RBS 20 based on parameters different from the input of friction braking system 30. Alternatively, processor 104 may be configured as a shared processor module for performing other functions unrelated to operating RBS 20.

Processor 104 may be configured to receive data and/or signals from components of RBS 20 and process the data and/or signals to determine one or more conditions of vehicle 10. For example, processor 104 may receive the signal generated by accelerator pedal 120 via, for example, I/O interface 108. As described in more detail below, processor 104 may also receive information regarding the motion and/or operation status of vehicle 10 from sensory system 150 via, for example, communication interface 110. Processor 104 may further generate and transmit a control signal for actuating one or more components of RBS 20, such as electric motors 130 and associated power electronics.

Processor 104 may execute computer instructions (program codes) stored in memory 102 and/or storage 106, and may perform functions in accordance with exemplary techniques described in this disclosure. More exemplary functions of processor 104 will be described later in relation to FIGS. 3-5.

Memory 102 and storage 106 may include any appropriate type of mass storage provided to store any type of information that processor 104 may need to operate. Memory 102 and storage 106 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 102 and/or storage 106 may be configured to store one or more computer programs that may be executed by processor 104 to perform exemplary braking control functions disclosed in this application. For example, memory 102 and/or storage 106 may be configured to store program(s) that may be executed by processor 104 to determine the deceleration of vehicle 10 when accelerator pedal 120 is not depressed. The program(s) may also be executed by processor 104 to generate a proper amount of regenerative braking based on the determined deceleration. For example, upon determining that vehicle 10 is currently decelerated by friction braking system 30, processor 104 may control electric motors 130 to enter into a generator mode. As the back electromotive force (emf) in electric motors 130 builds up, the motor current may quickly reverse direction and start to charge the battery pack, so as to generate the regenerative braking torques. Moreover, processor 104 may execute the program(s) to adjust the current limit of the powertrain based on the deceleration of vehicle 10, so as to adjust the amount of regenerative braking accordingly.

Memory 102 and/or storage 106 may be further configured to store information and data used by processor 104. For instance, memory 102 and/or storage 106 may be configured to store one or more functions specifying the desired amount of regenerative braking and the deceleration of vehicle 10. As another example, memory 102 and/or storage 106 may also store the sensor data generated by sensor system 150, which may be further processed by processor 104.

I/O interface 108 may be configured to facilitate the communication between powertrain controller 100 and other components of RBS 20. For example, I/O interface 108 may receive a signal generated by accelerator pedal 120, and transmits the signal to processor 104 for further processing. I/O interface 108 may also output commands to electric motors 130 or other components of the powertrain (e.g., power electronics) for adjusting the magnitudes of regenerative braking torques and/or distribution of the regenerative braking torques among wheels 12, 14.

Communication interface 110 may be further configured to communicate with sensor system 150, user interface 160, and/or friction braking system 30 via network 170. Network 170 may be any type of wired or wireless network that may allow transmitting and receiving data. For example, network 170 may be a wired network, a local wireless network (e.g., Bluetooth™, WiFi, near field communications (NFC), etc.), a cellular network, an Internet, or the like, or a combination thereof. Other known communication methods, which provide a medium for transmitting data are also contemplated.

As described above, when RBS 20 is activated during a braking event, electric motors 130 operate as generators to convert the kinetic energy of vehicle 10 into electric energy stored in an energy storage device, for example, a battery pack of vehicle 10. Meanwhile, electric motors 130 provide regenerative braking torques to wheels 12, 14 to slow down vehicle 10. Powertrain controller 100 may control the operation of electric motors 130.

In the disclosed embodiments, various numbers of electric motors 130 may be arranged to provide traction and regenerative braking torques to the same or different wheels 12, 14. For example, vehicle 10 may use a single electric motor 130 to drive the front axle, i.e., front wheels 12. Alternatively, vehicle 10 may include two electric motors 130, each of which may be used to drive an individual front wheel, i.e., front right wheel 12R and front left wheel 12L, respectively. With these motor configurations, front wheels 12 may be braked by both regenerative braking and friction braking, while the rear wheels are braked solely by friction braking. Similarly, one or more electric motors 130 may be used to provide traction and regenerative braking torques to rear wheels 14.

In some embodiments, vehicle 10 can be switched among the AWD, FWD, and/or RWD modes, as needed. For example, vehicle 10 may be initially in the FWD mode, with front wheels 12 being driven and braked by one or more electric motors 130. When vehicle 10 is commanded to switch to the AWD mode, powertrain controller 100 may engage the same one or more electric motors 130, or additional electric motors 130, to the rear axle, such that rear wheels 14 may also be driven and braked by electric motors 130. As such, powertrain controller 100 may control when certain wheels can be applied with the regenerative braking torque.

In some embodiments, when wheels 12, 14 are coupled with different electric motors 130, powertrain controller 100 may apply different magnitudes of regenerative braking torques to different wheels 12, 14 by controlling the respective electric motors 130. For example, powertrain controller 100 may individually control the different electric motors 130, to not only adjust the magnitude of torque but also the direction of the torque (i.e., traction or braking) on each wheel.

Practically, the amount of regenerative braking provided by RBS 20 is limited by many factors. One such limiting factor is the State of Charge (SoC) of the battery pack. This is because the electric power generated by RBS 20 is determined by the battery voltage and the charging current that can be fed into the battery pack. Generally, when the SoC approaches its upper limit, the charging current decreases and thus the braking torque generated by the RBS 20 also decreases. Moreover, the internal resistance of the battery pack may rise exponentially when the SoC exceeds above certain level, e.g., 90%. In this case, RBS 20 needs to be disabled to avoid overheating or overcharging the battery pack.

In order to closely monitor the state of the battery pack, powertrain controller 100 may be communicatively coupled to BMS 140. BMS 140 is associated with the battery pack and configured to manage the usage and charging of the battery pack in a safe and reliable manner. In particular, BMS 140 may constantly monitor the SoC of the battery pack. For example, BMS 140 may monitor the output voltage of the battery pack, voltages of individual cells in the battery pack, current in and/or out of the battery pack, etc. BMS 140 may send information regarding the SoC to powertrain controller 100 for further processing. In some embodiments, BMS 140 may also be configured to monitor the state of health (SoH) of the battery pack, including the battery temperature. For example, when detecting that the battery pack is overheated, BMS 140 may send a warning signal to powertrain controller 100 for temporarily disabling RBS 20.

Consistent with the disclosed embodiments, powertrain controller 100 may closely monitor the state of vehicle 10 in order to preciously control the generation of proper amounts of regenerative braking torques and/or distribution of the regenerative braking torques among wheels 12, 14. Sensor system 150 may include various sensors configured to detect the operation and/or motion state of vehicle 10. For example, sensor system 150 may include but are not limited to: one or more wheel speed sensors configured to detect the rotational speed of wheels 12, 14; an accelerometer configured to determine the linear acceleration of vehicle 10 in the longitudinal direction, i.e., the direction parallel to the chassis of vehicle 10; a suspension sensor configured to detect the linear movement of the body of vehicle 10 in a vertical direction; a steering angle sensor configured to detect the angle of the steering wheel (part of steering system 40) as measured from a neutral position indicating that front wheels 12 are parallel and pointing straight forward; a yaw sensor configured to determine the orientation of the chassis with respect to the direction of travel; an angular rate gyro configured to measure the yaw rate of vehicle 10; and/or a weight sensor configured to detect the weight of vehicle 10 and/or the distribution of the weight over the axles/wheels.

In certain embodiments, various sensors measuring the deceleration/acceleration and angular rates of vehicle 10 may be integrated in an inertial measurement unit (IMU). For example, the IMU may be a 6-degree of freedom (6 DOF) IMU, which consists of a 3-axis accelerometer, 3-axis angular rate gyros, and sometimes a 2-axis inclinometer. The 3-axis angular rate gyros may provide signals indicative of the pitch rate, yaw rate, and roll rate of vehicle 10. The 3-axis accelerometer may provide signals indicative of the acceleration of vehicle 10 in the x, y, and z directions.

Figure 2:
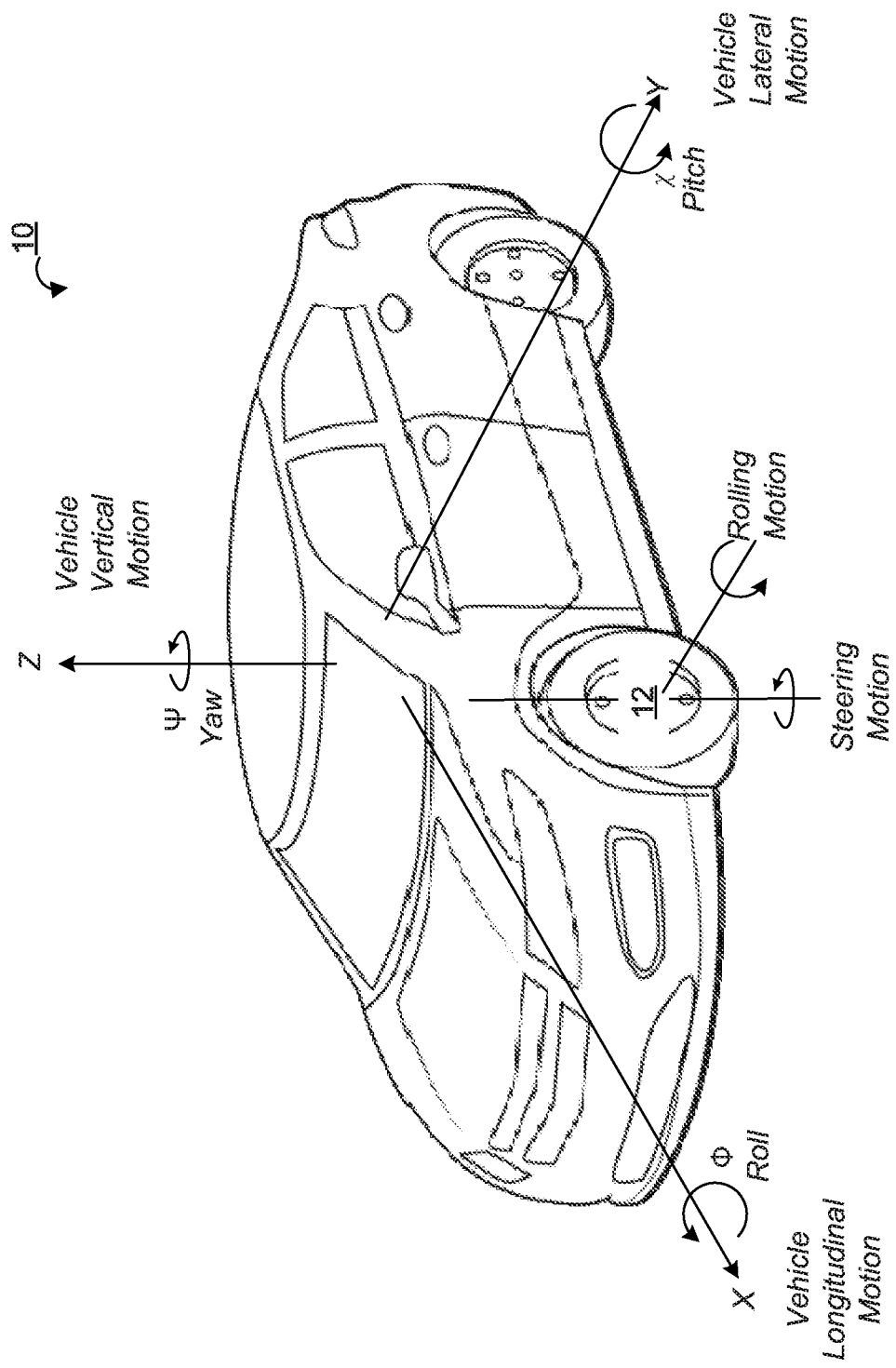
FIG. 2 is a schematic diagram illustrating certain exemplary motion parameters measured by a sensor system shown in FIG. 1.

FIG. 2 is a schematic diagram illustrating some exemplary motion parameters measured by sensor system 150. Referring to FIG. 2, for example, the motion parameters may include the linear speeds and/or accelerations in the x, y, and z directions. The motion parameters may also include the angular rates, i.e., pitch rate, yaw rate, and roll rate, of vehicle 10. The motion parameters may further include the rotational speeds and steering angles of wheels 12, 14.

Consistent with the disclosed embodiments, the pitch rate and/or pitch angle of vehicle 10 may indicate whether vehicle 10 is in deceleration and/or whether friction braking system 30 has been activated. For example, when vehicle 10 is braking, some weight of vehicle 10 may transfer from the rear axle to the front axle, and thus cause vehicle 10 to pitch forward. As described in more detail below, powertrain controller 100 may determine whether friction braking system 30 is activated based on the pitch motion of vehicle 10, and then activate RBS 20 to provide additional braking torques. In some embodiments, besides gyros, the pitch motion may also be detected by a radio detecting and ranging (RADAR) sensor, a sound navigation and ranging (SONAR) sensor, a light detection and ranging (LIDAR) sensor, and/or a radio-frequency identification (RFID) sensor. These sensors are capable of detecting objects in the environment of vehicle 10. For example, the RADAR sensor may be used to sense the pitch angle and/or pitch rate of vehicle 10 by measuring the distance and/or change of distance from a front or rear bumper of vehicle 10 to the ground. By analyzing the distance and/or change of distance, powertrain controller 100 may determine the pitch angle and/or pitch rate of vehicle 10.

Referring back to FIG. 1, user interface 160 may be configured to receive input from the operator and transmit the input to powertrain controller 100. For example, user interface 160 may have a display including an LCD, an LED, a plasma display, or any other type of display, and provide a Graphical User Interface (GUI) presented on the display for user input and data display. User interface 160 may further include input devices, such as a touchscreen, a keyboard, a mouse, buttons, a knob, a dial, and/or a tracker ball. User interface 160 may be configured to receive user-defined settings. For example, the operator may reset, via user interface 160, the corresponding relationship between the amount of depression of accelerator pedal 120 and the target deceleration of vehicle 10 (i.e., the amount of regenerative braking commanded by accelerator pedal 120). In one embodiment, user interface 160 may be housed in the dashboard of vehicle 10. In another embodiment, user interface 160 may be part of a mobile device, for example, a smart phone that can wirelessly communicate with powertrain controller 100 via network 170.

Figure 3:
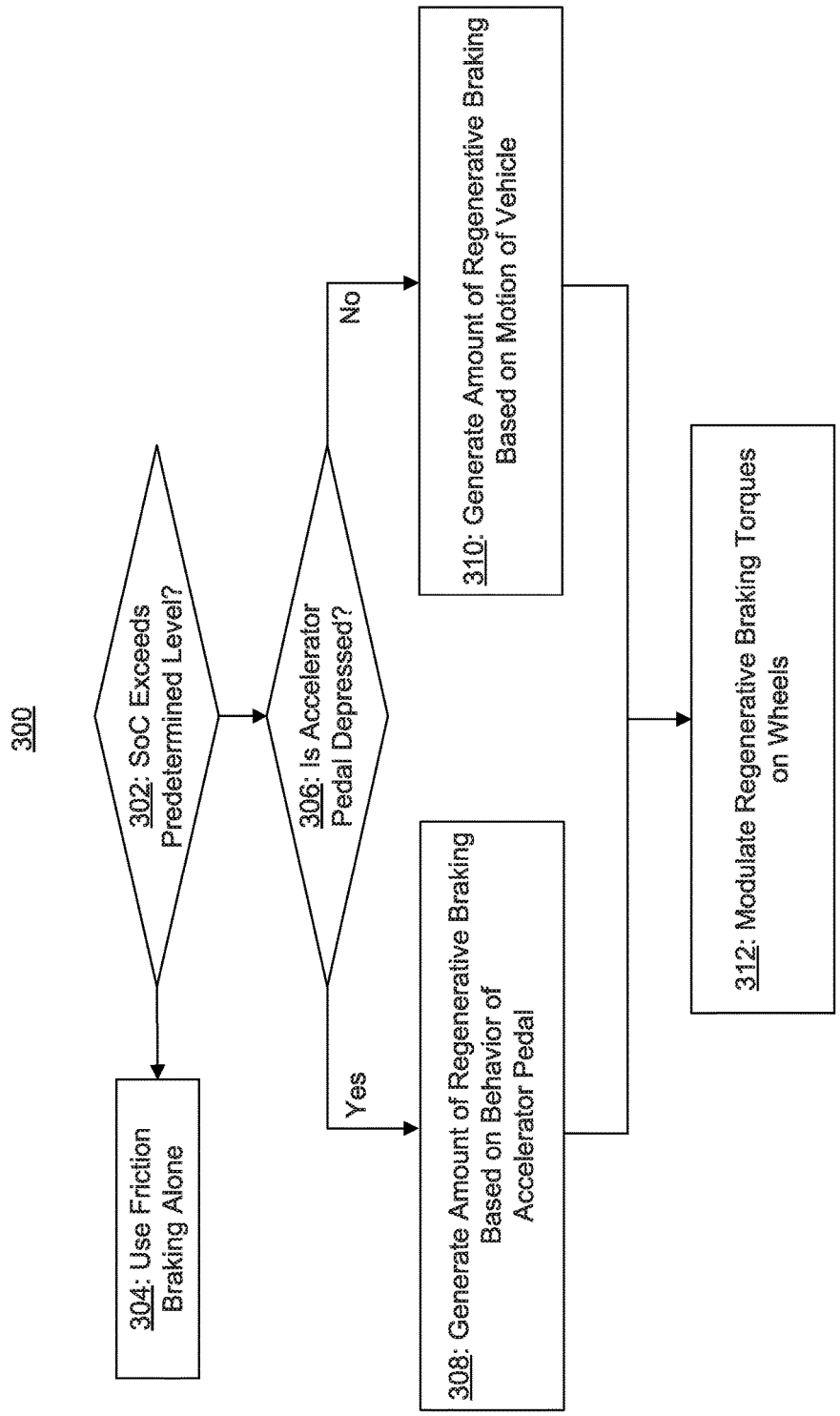
FIG. 3 is a flowchart of a method for controlling the Category A regenerative braking system shown in FIG. 1, according to an exemplary embodiment.

FIG. 3 is a flowchart of a method 300 for controlling RBS 20, according to an exemplary embodiment. For example, method 300 may be performed by components of system 10, such as powertrain controller 100.

In step 302, powertrain controller 100 may determine whether the current SoC of the battery pack equals or is above a predetermined level, which corresponds to a fully or near-fully charged state of the battery pack. For example, powertrain controller 100 may query BMS 140 about the current SoC. If yes, powertrain controller 100 may conclude the battery pack no longer needs regenerated power and it is undesirable to charge the battery pack. Thus, powertrain controller 100 may disable RBS 20 and let friction braking system 30 to provide the braking alone (step 304).

Conversely, if the SoC is below the predetermined level, powertrain controller 100 may proceed to determine whether accelerator pedal 120 is depressed (step 306). In one embodiment, accelerator pedal 120 may be associated with a sensor that constantly detects the position of accelerator pedal 120 and reports the position to powertrain controller 100. Accordingly, powertrain controller 100 is capable of constantly monitoring the position of accelerator pedal 120. In another embodiment, accelerator pedal 120 may be configured to only generate signals when it is depressed. As such, upon receiving the signals generated by accelerator pedal 120, powertrain controller 100 may determine that accelerator pedal 120 is depressed. Otherwise, when no signal is received from accelerator pedal 120, powertrain controller 100 may conclude that accelerator pedal 120 is not depressed.

When accelerator 120 is depressed, powertrain controller 100 may control RBS 20 to generate an amount of regenerative braking based on the behavior of accelerator pedal 120 (step 308). The behavior of accelerator pedal 120 may be characterized by position and/or moving speed of accelerator pedal 120, and thus reflects the manner of the operator in depressing accelerator pedal. In exemplary embodiments, the signal generated by accelerator pedal 120 may indicate the amount of depression or the position of accelerator pedal 120. Based on the signal, powertrain controller 100 may further determine the moving (releasing) speed of accelerator pedal 100.

As described above, when the amount of depression is less than $D_{coast}$, the signal may function as a request for powertrain controller 100 to decelerate vehicle 10. Accordingly, powertrain controller 100 may determine a target deceleration corresponding to the amount of depression and then determine the amount of regenerative braking necessary for achieving the target deceleration. In some embodiments, powertrain controller 100 may store a predetermined relationship between the amount of depression and the target deceleration, and thus may determine the target deceleration according to the relationship. For example, powertrain controller 100 may query a lookup table indicative of the relationship to identify the corresponding target deceleration. For another example, the target deceleration may be expressed as a function of the amount of depression and powertrain controller 100 may compute the target deceleration based on the function.

In some embodiments, the target deceleration corresponding to a substantially zero pedal depression may be set to be the maximum deceleration capable of being commanded by accelerator pedal 120. This way, when the operator completely or near-completely releases accelerator pedal 120, such maximum amount of regenerative braking may be obtained. In some embodiments, user interface 160 may allow the operator to adjust the relationship between the target deceleration and the pedal position according to her preference.

Figure 4:
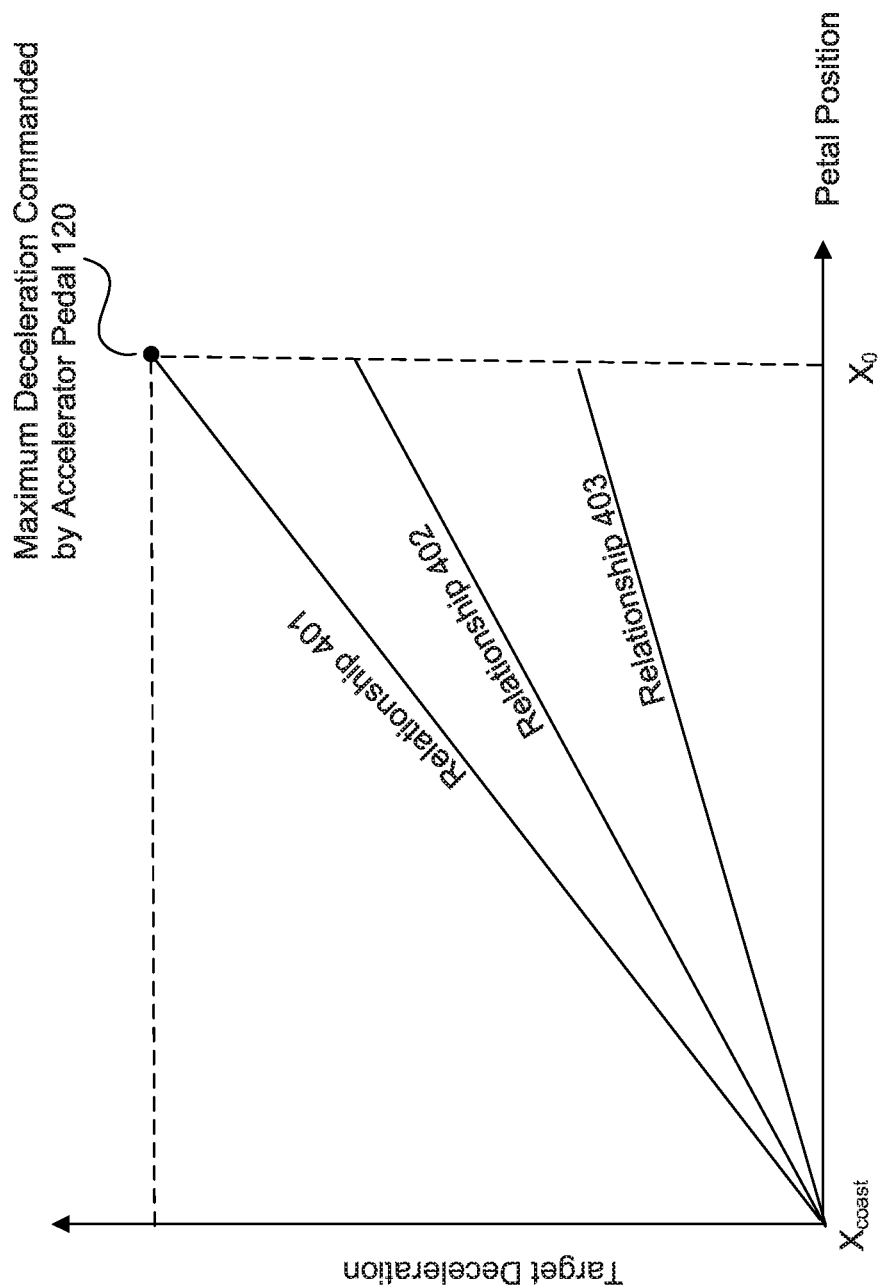
FIG. 4 is a schematic diagram illustrating exemplary relationships between the target deceleration of a vehicle and the amount of depression of an accelerator pedal.

In some embodiments, the target deceleration may be inversely proportional to the amount of depression. For example, FIG. 4 is a schematic diagram illustrating exemplary relationships in which the target deceleration of vehicle 10 is inversely proportional to the amount of depression of accelerator pedal 120. Referring to FIG. 4, the horizontal axis represents the position of accelerator pedal 120, with $X_{coast}$ denoting the pedal position that causes vehicle 10 to coast and $X_0$ denoting the pedal position at which accelerator pedal 120 is completely released. The vertical axis represents the target deceleration. Although the exemplary relationships illustrated in FIG. 4 are linear, it is contemplated that the relationships may also be non-linear.

Among the three relationships shown in FIG. 4, relationship 401 has the largest slope. According to relationship 401, the target deceleration at pedal position $X_0$ is the maximum deceleration achievable by regenerative braking, which corresponds to the maximum regenerated power that the battery pack can accept. Powertrain controller 100 may use relationship 401 as the default relationship for determining the target deceleration commanded by accelerator pedal 120. Moreover, the operator may adjust the relationship via user interface 160. For example, the operator may select relationship 403 for use by powertrain controller 100, so as to obtain a "softer" or less steep deceleration experience.

In some embodiments, powertrain controller 100 may also determine the target deceleration based on the releasing speed of accelerator pedal. The speed of the operator in lifting her foot from accelerator pedal 120 suggests how fast she wants to slow down vehicle 10. Thus, the target deceleration may be defined as a function of the releasing speed of accelerator pedal 120, which specifies that a higher releasing speed corresponds to a higher target deceleration, which requires a larger amount of commanded regenerative braking.

With continued reference to FIG. 3, when not depressed, RBS 20 can no longer receive input from accelerator pedal 120. Instead, in step 310, powertrain controller 100 may control RBS 20 to generate an amount of regenerative braking based on motion of vehicle 10. The motion of vehicle 10 is a type of input independent from the behavior of brake pedal 32, and thus enables RBS 20 to contribute to those braking events not initiated by accelerator pedal 120 while remain as a Category A system.

Specifically, powertrain controller 100 may receive, from sensor system 150, sensor data representing the real-time motion of vehicle 10 and determine the motion of vehicle 10 based on the sensor data. For example, sensor system 20 may include any number and/or combination of sensors known in the art for generating signals indicative of the motion of the vehicle, i.e., deceleration/acceleration, speed, angular rate (pitch rate, yaw rate, and roll rate), position, orientation, acceleration, and/or other motion parameters of vehicle 10. For example, an accelerometer may be used to detect the deceleration of vehicle 10 in a direction parallel to the chassis, while a RADAR sensor may be used to detect the pitch angle and/or pitch rate of vehicle 10. Moreover, a yaw sensor may be used to detect the yaw rate of vehicle 10. The present disclosure does not limit the types of sensors used to generate the sensor data representing the motion of vehicle 10.

In the disclosed embodiments, powertrain controller 100 may determine whether vehicle 10 is experiencing a braking event, such as whether friction braking system 30 is activated. For example, powertrain controller 100 may compare the current deceleration of vehicle 10 to the maximum deceleration capable of being commanded by accelerator pedal 120. If the current deceleration is higher than the maximum deceleration, powertrain controller 100 may conclude that friction braking system 30 is activated. As another example, powertrain controller 120 may determine whether friction braking system 30 is activated based on the pitch angle and/or pitch rate of vehicle 10. If, for instance, a large pitch angle is detected, powertrain controller 100 may conclude that brake pedal 32 is depressed hard by the operator and friction braking system 30 is activated.

Powertrain controller 100 may also assess the operator's intention to brake or decelerate vehicle 10 based on the motion of vehicle 10. For example, if the deceleration of vehicle 10 has lasted for longer than a predetermined amount of time, powertrain controller 100 may conclude that the operator intends to decelerate vehicle 10. The operator may be actively applying friction brakes on wheels 12, 14, or passively allowing vehicle 10 to slow down by resistance and/or gravity. As another example, if the deceleration of vehicle 10 continues to increase, powertrain controller 100 may conclude that the operator wants to apply more braking and/or slow down vehicle 10 faster.

Powertrain controller 100 may further determine a proper amount of regenerative braking to be generated by RBS 20, based on the motion of vehicle 10. For example, similar to the case when accelerator pedal 120 is depressed, powertrain controller 100 may store a corresponding relationship between the amount of regenerative braking and the deceleration of vehicle 10. The corresponding relationship may be in the form of a lookup table or a mathematical function of the deceleration. The corresponding relationship may be linear or nonlinear. For example, in one embodiment, the amount of regenerative braking may be set to be proportional to the deceleration.

Consistent with the disclosed embodiments, powertrain controller 100 may implement a control loop to generate the amount of regenerative braking based on the sensed motion parameters of vehicle 10, such as the deceleration or pitch motion. The following description uses the deceleration as an example to illustrate the process of generating regenerative braking, but it is contemplated that a similar process can be performed when pitch motion is sensed. Powertrain controller 100 may determine whether the current deceleration exceeds the maximum deceleration capable of being commanded by accelerator pedal 120. If the current deceleration is below or equal to the maximum deceleration, powertrain controller 100 may control the generation of regenerative braking based on the behavior of accelerator pedal 120. In contrast, if the current deceleration exceeds the maximum deceleration capable of being commanded by accelerator pedal 120, powertrain controller 100 may conclude that additional regenerative braking is needed and actuate RBS 20 to produce an amount of regenerative corresponding to the deceleration.

Moreover, powertrain controller 100 may monitor the deceleration and adjust the amount of regenerative braking in response to change of the deceleration over time. For example, if the deceleration increases over time, this may suggest that the operator wants more braking. Accordingly, powertrain controller 100 may generate more regenerative braking. In contrast, if the deceleration decreases, this may suggest that the operator feels the current braking is excessive and is reducing the depression on brake pedal 32. Accordingly, powertrain controller 100 may decrease the amount of regenerative braking.

The control loop also enables powertrain controller 100 to closely peg the generation of regenerative braking to the deceleration of vehicle 10. For example, when the operator applies/releases brake pedal 32 aggressively, powertrain controller 100 may ramp up/down the regenerative braking fast. Conversely, when the operator applies/releases brake pedal 32 gently, powertrain controller 100 may ramp up/down the regenerative braking slowly.

Because the regenerative braking generated in step 310 is not directly commanded by accelerator pedal 120, i.e., the operator, the corresponding relationship between the amount of regenerative braking and the deceleration of vehicle 10 may be carefully calibrated in order not to exceed the expectation of the operator and/or not to cause uncomfortable feelings to the operator. Moreover, because in many situations the regenerative braking is added on top of the friction braking commanded by the operation, unless it is an emergency stop, it may be proper to keep the amount of regenerative braking at a modest level.

Figure 5:
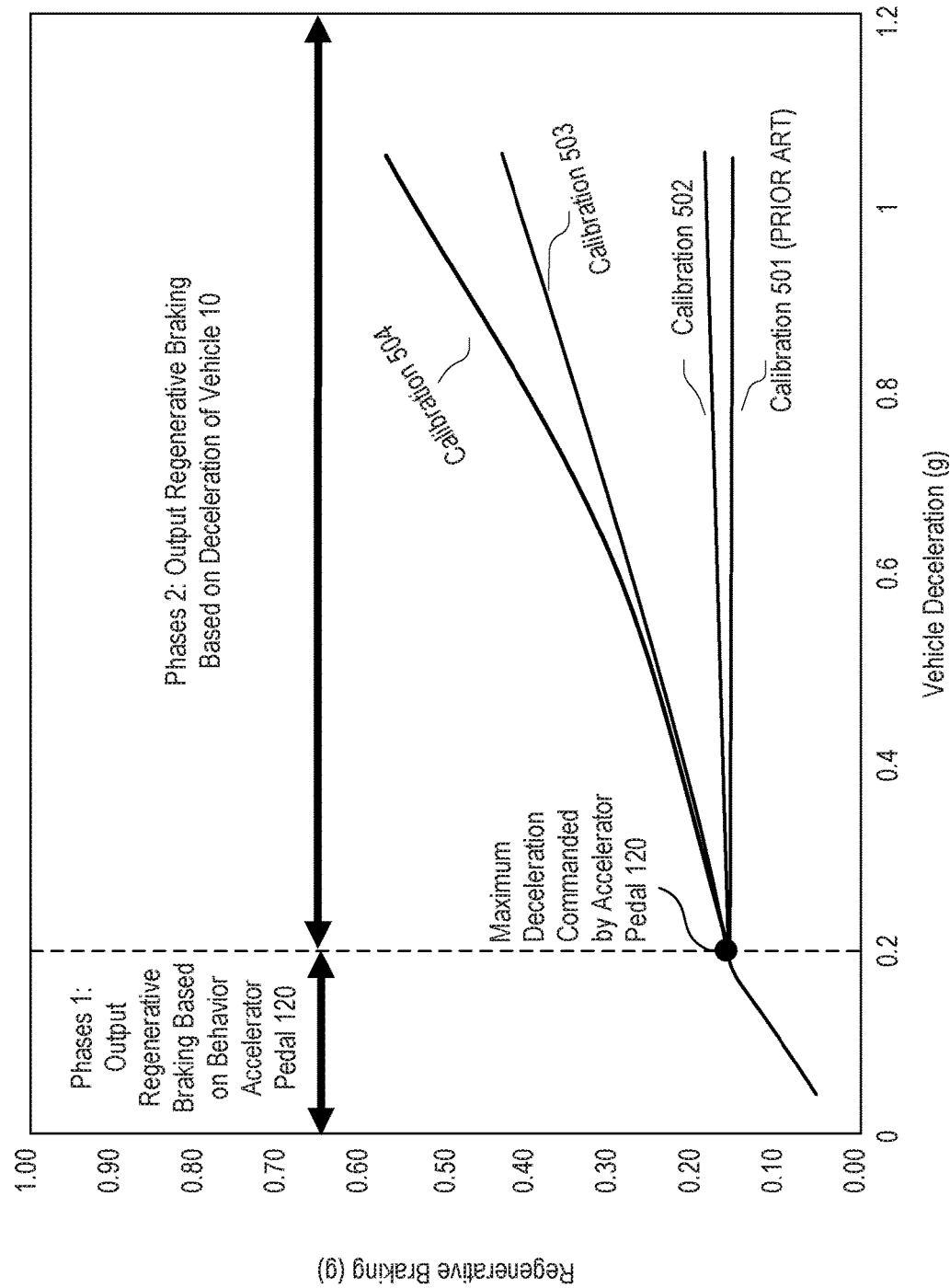
FIG. 5 is a schematic diagram illustrating exemplary relationships between the amounts of regenerative braking generated by various Category A regenerative braking systems and the deceleration of a vehicle.

FIG. 5 is a schematic diagram illustrating exemplary relationships between the amount of regenerative braking and the deceleration of vehicle 10. Referring to FIG. 5, the horizontal axis represents the deceleration of vehicle 10, and the vertical axis represents the amount of regenerative braking generated by RBS 20. Each relationship between the amount of regenerative braking and the deceleration may be divided into two phases. In phase 1, the deceleration of vehicle 10 is below or equal to the maximum deceleration commanded by accelerator pedal 120 and RBS 20 may output an amount of regenerative braking based on the behavior of accelerator pedal 120. The situation in phase 1 is similar to the situation illustrated in FIG. 4. On the other hand, in phase 2, RBS 20 outputs an amount of regenerative braking based on the deceleration of vehicle 10. This way, RBS 20 is capable of contribute to the entire range of events when vehicle 10 is braked or decelerated.

In practice, the relationship between the amount of regenerative braking and the deceleration may be calibrated differently. For example, calibration 503 represents a steep (aggressive) ramp-up profile or curve based on which the regenerative brake increases sharply as the deceleration increases, while calibration 502 represents a gradual (gentle) ramp-up profile based on which the regenerative breaking increases slowly as the deceleration increases. The curve corresponding to calibration 501 is flat in phase 2, meaning that no additional amount of regenerative braking is generated after accelerator pedal 120 is fully released. That is, calibration 501 represents the characteristics of a typical category A RBS.

Although calibrations 502 and 503 have linear ramp-up curves, it is contemplated that the ramp-up profile in phase 2 may also be non-linear. In some embodiments, friction braking system 30 may adopt a non-linear relationship between the amount of generated friction braking torque and the force applied on brake pedal 32. Accordingly, a non-linear ramp-up profile may be feasibly integrated into the inherent brake response of an existing braking system. Moreover, a non-linear ramp-up profile may also be consistent with an operator's expectation. For example, as shown in FIG. 5, phase 2 of calibration 504 has a progressive ramp-up curve, based on which the amount of regenerative braking increases at a faster rate as the deceleration increases. Higher deceleration may correspond to situations where the operator demands larger braking torques, such as during panic stops. As such, calibration 504 matches average drivers' expectations.

In some embodiments, the relationship may be calibrated based on statistical data regarding average drivers' preferences. For example, the statistical data may indicate how aggressively average drivers apply brakes. If average drivers tend to apply the brakes gently, the relationship may be calibrated to slowly ramp up the amount of regenerative braking based on the deceleration of vehicle 10.

In some embodiments, a plurality of existing calibrations of the corresponding relationship may be provided to the operator via user interface 160, to allow the operator to select a preferred calibration. For example, user interface 160 may display the ramp-up curves corresponding to the existing calibrations on a touch screen, and the operator may select a preferred calibration by selecting the area of the touch screen displaying the preferred calibration. As another example, user interface 160 may include a rotation knob that can be pointed to "high," "medium," and "low," corresponding to fast, modest, and slow ramp-up of the regenerative braking based on the deceleration of vehicle 10. In one embodiment, user interface 160 may also display numerical values of the calibration parameters (e.g., slope of a ramp-up curve) on a screen. User interface 160 may also provide a physical or virtual keyboard for the operator to fine tune the calibration parameters.

In some embodiments, vehicle 10 may be driven by different operators at different times. Powertrain controller 100 may be configured to save a preferred ramp-up profile for each operator. When a particular operator drives vehicle 10, powertrain controller 100 may obtain the operator's identify information provided via user device 160 or automatically through a biometric sensor, a camera, or a mobile device of the operator, in communication with powertrain controller 100. After the operator is identified, powertrain controller 100 may retrieve the preferred ramp-up profile corresponding to the operator's identity.

In some embodiments, powertrain controller 100 may also automatically determine a proper ramp-up profile and/or select a proper ramp-up profile from existing calibrations, based on the driving habit of each individual operator. For example, if an operator consistently maneuvers and/or brakes aggressively, powertrain controller 100 may use a ramp-up profile with a steep slope, such as calibration 503 shown in FIG. 5. Conversely, if an operator generally operates vehicle 10 in a smooth manner, and rarely makes abrupt changes to the status of vehicle 10, powertrain controller 100 may use a ramp-up profiles with a less steep slope, such as calibration 502 shown in FIG. 5.

Powertrain controller 100 may determine the driving habit of the operator based on sensor data generated by sensor system 150. Based on the sensory data, powertrain controller 100 may analyze patterns of the movement/operation of vehicle 10 and then derive the driving habit. For example, if the sensor data shows vehicle 10 frequently makes fast decelerations, powertrain controller 100 may conclude that the operator is used to aggressive braking, and thus a steep (aggressive) ramp-up profile of the regenerative braking torques is suitable for the operator.

Moreover, although RBS 20 as a Category A system cannot use the input on brake pedal 32 in real time, powertrain controller 100 may use historical usage data of friction braking system 30 to determine the driving habit of the operator. For example, such usage data may indicate how hard and/or fast the operator usually depress brake pedal 32, how fast the friction braking torques ramp up, etc. The usage data may be recorded and periodically loaded to powertrain controller 100, which then analyzes the data to determine the operator's driving habit. For example, if the usage data indicates that the operator depressed brake pedal 32 all the way to the floor in more than 50% of the braking events, powertrain controller 100 may conclude that the operator has a tendency to brake aggressively.

Still referring to FIG. 3, whether step 308 or step 310 is performed (i.e., whether accelerator pedal 120 is depressed or not), powertrain controller 100 may modulate the regenerative braking torques applied on wheels 12, 14 based on the operation and/or motion state of vehicle 10. In particular, powertrain controller 100 may adjust distribution of the regenerative braking among wheels 12, 14 and the magnitude of the regenerative braking torque applied on each wheel 12, 14.

In the disclosed embodiments, powertrain controller 100 may modulate the distribution of regenerative braking between the front and rear axles based on the steering of vehicle 10. In one embodiment, steering system 40 may be capable of steering the front and rear axles separately. If, for example, the back axle is currently steered, powertrain controller 100 may attribute more regenerative braking to the front axle, in order not to compromise the steering response of the rear axle.

In the disclosed embodiments, powertrain controller 100 may distribute proper amounts of regenerative braking torques on wheels 12, 14 based on the wheel conditions and road surface conditions. For example, powertrain controller 100 may distribute the regenerative braking torques based on the differences among the wheel rotational speeds. When a wheel is rotating noticeably slower than other wheels, powertrain controller 100 may determine that a wheel slip occurs at the slower wheel. For another example, powertrain controller 100 may determine the road friction coefficient and longitudinal speed of vehicle 10 based on the wheel rotational speed, yaw rate, and steering angle. Powertrain controller 100 may further determine the slip ratio for each wheel based on differences between the longitudinal speed of vehicle 10 and the wheel rotational speeds.

In some embodiments, the regenerative braking torques on some or all of wheels 12, 14 can be individually adjusted, such as when different wheels are driven by different electric motors 130. As such, powertrain controller 100 may only reduce the regenerative braking torques on the wheels with slips while maintain the regenerative braking torques on other unaffected wheels. Moreover, powertrain controller 100 may distribute the regenerative braking torques among wheels 12, 14 based on the friction coefficient at each wheel. For example, powertrain controller 100 may allocate more regenerative braking torques to the wheels with higher friction coefficients while allocate less regenerative braking torques to the wheels with less friction coefficients. This way, powertrain controller 100 may avoid wheel slips. For example, if vehicle 10 has the right wheels 12R, 14R on ice and the left wheels 12L, 14L on a dry road surface, powertrain controller 100 may remove regenerative braking torques from right wheels 12R, 14R.

In a braking event, the weight of vehicle 10 may dynamically shift to the front axle, as manifested by the change of pitch angle of vehicle 10. Accordingly, in some embodiments, powertrain controller 100 may also be configured to adjust the distribution of regenerative braking among wheels 12, 14 in response to the weight shift. For example, powertrain controller 100 may determine the change of weight distribution during a braking event based on the pitch angle and/or pitch rate of vehicle 10 and apply more regenerative braking torques to wheels 12, 14 that bear more weight. Because regenerative braking torques can be generated and adjusted at a fast rate, RBS 20 is well positioned to swiftly react to the weight shift.

Figure 6:
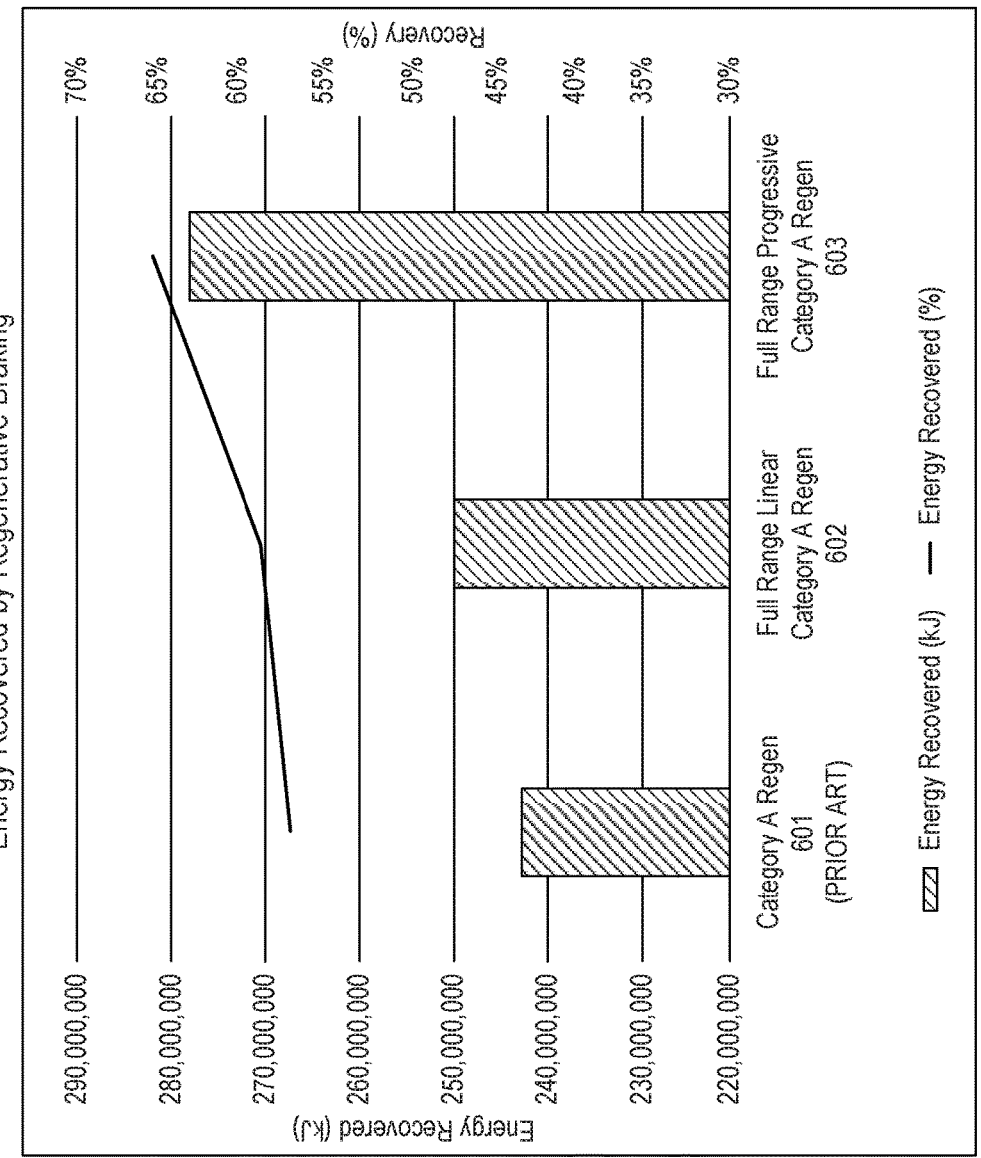
FIG. 6 is a schematic diagram illustrating exemplary amounts of energy recoverable by various Category A regenerative braking systems.

FIG. 6 is a schematic diagram illustrating exemplary amounts of energy recoverable by various Category A regenerative braking systems. Referring to FIG. 6, the left vertical axis represents the absolute amount of energy recovered by a RBS during a vehicle life (i.e., the average lifetime of a vehicle), and the right vertical axis represents the recovered energy as a percentage of the maximum energy recoverable by a RBS. The numbers used in FIG. 6 are for illustrative purpose only.

Still referring to FIG. 6, "Category A Regen 601" represents the amount/percentage of energy recovered by a conventional Category A regenerative braking system, whose output is limited to the maximum amount of regenerative braking capable of being commanded by an acceleration pedal. In contrast, "Category A Regen 602" and "Category A Regen 603" represent the amounts/percentages of energy recovered by the disclosed Category A regenerative braking systems that can contribute to the entire ranges of braking events experienced by a vehicle, including the braking events when the vehicle's friction braking system is used. Both Category A Regen 602 and Category A Regen 603 have higher energy efficiencies than Category A Regen 601. Moreover, Category A Regen 602 uses a linear ramp-up profile in phase 2 (e.g., calibration 502 in FIG. 5) and has a modest improvement in energy efficiency. Category A Regen 603 uses a progressive ramp-up profile in phase 2 (e.g., calibration 504 in FIG. 5) and achieves even greater improvement in energy efficiency. Consistent with the disclosed embodiments, with careful calibration of the ramp-up profile, a balance may be stricken between maximizing energy efficiency and maintaining a satisfactory user experience.

As illustrated by FIGS. 5 and 6, different ramp-up profiles may produce different amounts of regenerative braking torques and lead to different energy efficiencies. As described above, the disclosed system may be configured to use different ramp-up profiles for different drivers or allow the ramp-up profiles to be calibrated. Therefore, the operation capacity and energy efficiency of the disclosed system may be scaled according to each driver's preference and driving habit. In some embodiments, the disclosed system may also train a driver to adapt to a particular ramp-up profile that is more energy efficient but causes braking experience considered unusual by a driver. For example, the disclosed system may start with using a gentle ramp-up profile (e.g., calibration 502 in FIG. 5) for the driver. After the driver gets used to the first ramp-up profile, the system may use a more aggressive ramp-up profile (e.g., calibration 503 or 504 in FIG. 5). As such, the slope of the used ramp-up profile may be gradually increased until an optimal setting is reached.

Besides the improved operation capacity and energy efficiency, the disclosed system can also improve a vehicle's overall braking performance. For example, the additional regenerative braking provided by RBS can counteract the reduction of friction braking due to wear of brake pads or shoes. Moreover, the system helps to extend the life of the friction braking system, by reducing the wear in the components of the friction braking system (such as brake pads, brake shoes, and rotors) and reducing the operation temperature of the friction braking system.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed regenerative braking control system and related methods. Other embodiments will be apparent to those skilled in the art from consideration of the specification and practice of the disclosed regenerative braking control system and related methods. It is intended that the specification and examples be considered as exemplary only, with a true scope being indicated by the following claims and their equivalents.

What is claimed is:

1. A regenerative braking system separate from a friction braking system of a vehicle, the regenerative braking system comprising:
   at least one actuator;
   an user interface configured to receive a user input selecting one of a plurality of ramp-up speed of regenerative braking; and
   a controller configured to:
      determine whether an accelerator pedal is depressed;
      when the accelerator pedal is depressed, determine an amount of regenerative braking based on behavior of the accelerator pedal and the selected ramp-up speed;
      when the accelerator pedal is not depressed, determine the amount of regenerative braking based on motion of the vehicle and the selected ramp-up speed; and
      control the at least one actuator to generate the determined amount of regenerative braking.

2. The regenerative braking system of claim 1, wherein the controller is further configured to:
   when the accelerator pedal is not depressed, determine that the friction braking system is activated based on the motion of the vehicle; and
   activate the regenerative braking system.

3. The regenerative braking system of claim 1, wherein when the accelerator pedal is not depressed, the determined amount of regenerative braking is a function of a deceleration of the vehicle.

4. The regenerative braking system of claim 3, wherein the controller is further configured to:
   receive a user input for calibrating a relationship between the deceleration of the vehicle and a desired amount of regenerative braking; and
   calibrate the function based on the user input.

5. The regenerative braking system of claim 3, wherein the controller is further configured to: determine the function based on driving habit of a user of the vehicle.

6. The regenerative braking system of claim 5, wherein the controller is further configured to: determine the driving habit based on the motion of the vehicle.

7. The regenerative braking system of claim 5, wherein the controller is further configured to:
   obtain historical brake usage data indicative of the user's manner in braking the vehicle; and
   determine the driving habit based on the historical brake usage data.

8. The regenerative braking system of claim 1, wherein the controller is further configured to: when the accelerator pedal is not depressed, determine the amount of regenerative braking based on a pitch angle or a pitch rate of the vehicle.

9. The regenerative braking system of claim 1, wherein the controller is further configured to: receive sensor data generated by one or more sensors in communication with the controller; and determine the motion of the vehicle based on the sensor data.

10. The regenerative braking system of claim 9, wherein the sensor data is generated by at least one of an accelerometer, a speed sensor, a pitch sensor, a yaw sensor, a suspension sensor, a steering angle sensor, or a gravitational sensor.

11. The regenerative braking system of claim 1, wherein the behavior of the accelerator pedal includes at least one of position or moving speed of the accelerator pedal.

12. The regenerative braking system of claim 11, wherein the amount of regenerative braking is inversely proportional to an amount of depression of the accelerator pedal.

13. The regenerative braking system of claim 1, wherein the controller is further configured to:
receive a user input for calibrating a relationship between a desired deceleration of the vehicle and an amount of depression of the accelerator pedal; and
when the accelerator pedal is depressed, determine the amount of regenerative braking based on the relationship.

14. The regenerative braking system of claim 1, wherein the controller is further configured to:
adjust magnitudes of regenerative braking torques applied on one or more wheels of the vehicle based on the rotational speeds of the one or more wheels, friction coefficients between the one or more wheels and a road surface, weight distribution of the vehicle, or a steering angle of the vehicle.

15. A computer-implemented method for controlling a regenerative braking system separate from a friction braking system of a vehicle, the method comprising:
determining whether an accelerator pedal is depressed;
receiving a user input selecting one of a plurality of ramp-up speed of regenerative braking;
when the accelerator pedal is depressed, determining an amount of regenerative braking based on behavior of the accelerator pedal and the selected ramp-up speed;
when the accelerator pedal is not depressed, determining the amount of regenerative braking based on motion of the vehicle and the selected ramp-up speed; and
controlling at least one actuator to generate the determined amount of regenerative braking.

16. The method of claim 15, wherein when the accelerator pedal is not depressed, the determined amount of regenerative braking is a function of a deceleration of the vehicle.

17. The method of claim 16, further comprising:
receiving a user input for calibrating a relationship between the deceleration of the vehicle and a desired amount of regenerative braking; and
calibrating the function based on the user input.

18. The method of claim 16, further comprising: determining the function based on driving habit of a user of the vehicle.

19. The method of claim 15, further comprising: when the accelerator pedal is not depressed, determining the amount of regenerative braking based on a pitch angle or a pitch rate of the vehicle.

20. A vehicle, comprising:
a friction braking system;
an user interface configured to receive a user input selecting one of a plurality of ramp-up speed of regenerative braking; and
a regenerative braking system separate from the friction braking system, the regenerative braking system comprising:
an accelerator pedal;
at least one actuator; and
a controller configured to:
determine whether an accelerator pedal is depressed;
when the accelerator pedal is depressed, determine an amount of regenerative braking based on behavior of the accelerator pedal and the selected ramp-up speed;
when the accelerator pedal is not depressed, determine the amount of regenerative braking based on motion of the vehicle and the selected ramp-up speed; and
control the at least one actuator to generate the determined amount of regenerative braking.

* * * * *